US011612906B2

(12) United States Patent
Schlenker

(10) Patent No.: US 11,612,906 B2
(45) Date of Patent: Mar. 28, 2023

(54) CLOGGED NOZZLE DETECTION

(71) Applicant: Caterpillar Paving Products Inc., Brooklyn Park, MN (US)

(72) Inventor: Brian J. Schlenker, Shoreview, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 0 days.

(21) Appl. No.: 17/112,461

(22) Filed: Dec. 4, 2020

(65) Prior Publication Data

US 2022/0176400 A1    Jun. 9, 2022

(51) Int. Cl.
*B05B 15/50* (2018.01)
*G01M 13/00* (2019.01)

(52) U.S. Cl.
CPC ............. *B05B 15/50* (2018.02); *G01M 13/00* (2013.01)

(58) Field of Classification Search
CPC ..... B05B 15/50; B05B 12/085; B05B 9/0423; B05B 15/18; B05B 12/008; B05B 1/20; B05B 15/52; B05B 1/3013; B05B 12/04; B05B 13/005; B05B 12/08; G01M 13/00; G05D 7/0635; E01C 19/176; E01C 19/48; E01C 23/22; E02D 3/12
See application file for complete search history.

(56) References Cited

U.S. PATENT DOCUMENTS

| | | | | |
|---|---|---|---|---|
| 7,134,610 B2 * | 11/2006 | Wulteputte | ........... | B05B 7/2489 239/377 |
| 9,008,847 B2 * | 4/2015 | Clausmann | ............ | B23Q 17/00 700/282 |
| 10,060,085 B2 * | 8/2018 | Christian | ................... | B05B 1/20 |
| 2005/0011281 A1 * | 1/2005 | Wulteputte | ........... | B05B 12/085 73/861.41 |
| 2013/0153676 A1 * | 6/2013 | Ballu | .................... | A01C 23/007 239/11 |
| 2020/0055078 A1 | 2/2020 | Minichev et al. | | |

FOREIGN PATENT DOCUMENTS

| | | | | |
|---|---|---|---|---|
| CN | 110306406 A | * | 10/2019 | .......... E01C 19/176 |
| JP | 2006007136 | | 1/2006 | |
| WO | 2015040778 | | 3/2015 | |

OTHER PUBLICATIONS

Machine translation of CN 110306406 A (Year: 2019).*

* cited by examiner

*Primary Examiner* — Lee E Rodak
*Assistant Examiner* — Sangkyung Lee

(57) ABSTRACT

A work machine can include a frame; a spray system couple to the frame and including a spray bar having a plurality of nozzles; a pressure sensor to detect a pressure of a liquid within the spray bar; and a controller to determine whether the detected pressure of the liquid within the spray bar has exceeded a pre-determined pressure threshold.

17 Claims, 4 Drawing Sheets

CLOGGED NOZZLE DETECTION

TECHNICAL FIELD

The present disclosure generally relates to a work machine. More particularly, the present disclosure relates to a system and method to detect a clogged nozzle.

BACKGROUND

Some work machines, such as cold planers and rotary mixers, have spray systems that include a spray bar with a plurality of spray nozzles. The spray systems may spray water or an emulsion mixture into the mixing chamber or may spray a cooling liquid on the milling drum. Similar spray systems can also be used on asphalt paving machines and compactors. However, the nozzles on the spray bars can become clogged with material during operation.

JP 2006/007136 discusses using high pressure air to remove clogging of a spray nozzle.

SUMMARY

In one example according to this disclosure, a work machine can include a frame; a spray system couple to the frame and including a spray bar having a plurality of nozzles; a pressure sensor to detect a pressure of a liquid within the spray bar; and a controller to determine whether the detected pressure of the liquid within the spray bar has exceeded a pre-determined pressure threshold.

In one example according to this disclosure, a milling machine can include a frame; a milling assembly on the frame including a drum housing; a cutting rotor located within the drum housing; a spray system including a spray bar having a plurality of nozzles to deliver a liquid within the drum housing; a pressure sensor to detect a pressure of a liquid within the spray bar; and a controller to determine whether the pressure of the liquid within the spray bar has been exceeded pre-determined pressure threshold to determine whether any of the plurality of nozzles have been clogged.

In one example, a method of detecting a clogged nozzle in a spray bar having a plurality of nozzles can include determining a pressure of liquid within the spray bar; and if the pressure of the liquid reaches a pre-determined threshold, determining that one or more of the nozzles of the spray bar are clogged.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
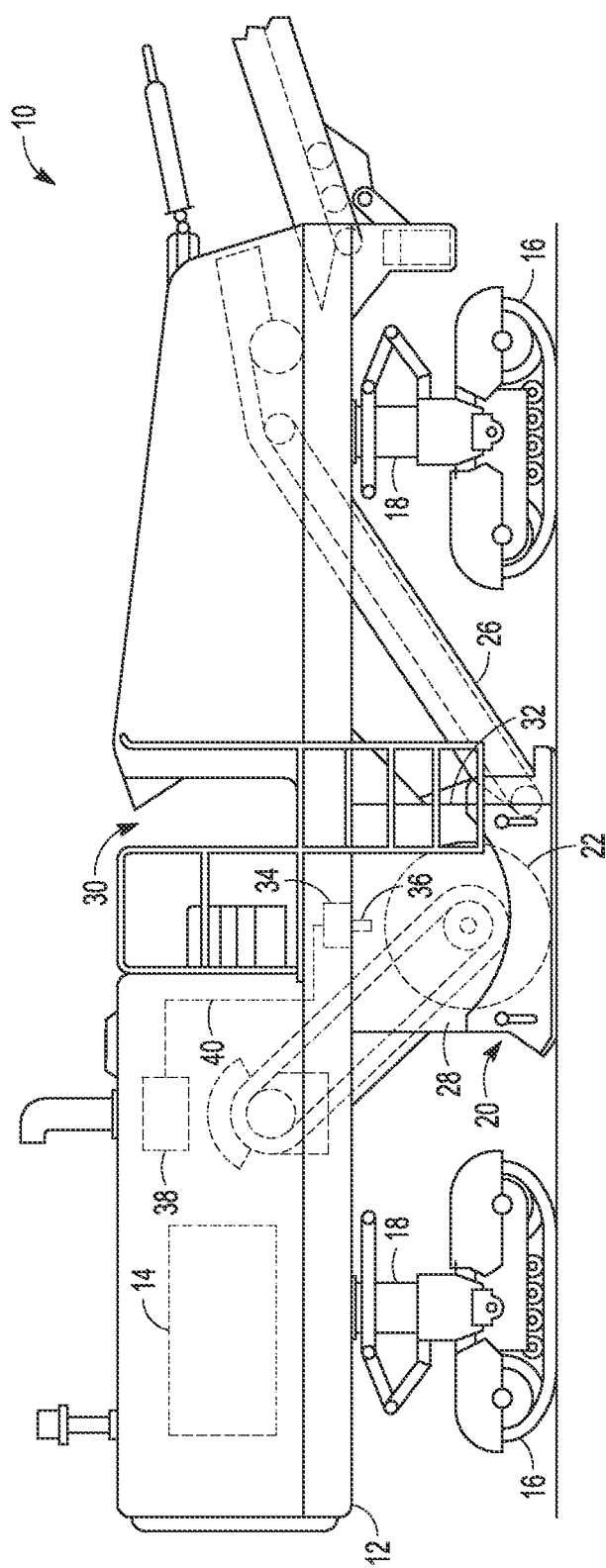
FIG. 1 shows a side view of a cold planer, in accordance with one embodiment.

FIG. 1 shows a side view of a cold planer 10, in accordance with one embodiment. The cold planer 10 can include a frame 12 and a power source 14 connected to the frame 12. The power source 14 can be provided in any number of different forms including, but not limited to, Otto and Diesel cycle internal combustion engines, electric motors, hybrid engines and the like. The frame 12 is supported by transportation devices 16 via lifting columns 18. The transportation devices 16 may be any kind of ground-engaging device that allows to move the cold planer 10 in a forward direction over a ground surface, for example a paved road or a ground already processed by the cold planer 10. For example, in the shown embodiment, the transportation devices 16 are configured as track assemblies. The lifting columns 18 are configured to raise and lower the frame 12 relative to the transportation devices and the ground.

The cold planer 10 further includes a milling assembly 20 connected to the frame 12. The milling assembly 20 includes a drum housing 28 holding a rotatable cutting rotor 22 operatively connected to the power source 14. The cutting rotor 22 can be rotated about a drum axis extending in a direction perpendicular to the frame axis. As the rotatable cutting rotor 22 spins about its drum axis, cutting bits on the cutting rotor 22 can engage hardened materials, such as, for example, asphalt and concrete, of existing roadways, bridges, parking lots and the like. As the cutting bits engage such hardened materials, the cutting bits remove layers of these hardened materials. The spinning action of the rotatable drum 22 and its cutting bits then transfers the hardened materials to a first stage conveyor 26 via a discharge port 32 on the drum housing 28. The first stage conveyor 26 can be coupled to the frame 12 and located at or near the discharge port 32.

The drum housing 28 includes front and rear walls, and a top cover positioned above the cutting rotor 22. Furthermore, the drum housing 28 includes lateral covers on the left and right sides of the cutting rotor 22 with respect to a travel direction of the cold planer 10. The drum housing 28 is open toward the ground so that the cutting rotor 22 can engage in the ground from the drum housing 28. The drum housing includes the discharge port 32 in a front wall to discharge material to the first stage conveyor 26, which is located at or near the discharge port 32.

The cold planer 10 further includes an operator station or platform 30 including an operator interface for inputting commands to a control system for controlling the cold planer 10, and for outputting information related to an operation of the cold planer 10.

The cold planer 10 can include a spray system coupled to the frame 12 and including a tank 38 and a fluid line 40 which delivers liquid from the tank 38 to a spray bar 34 having a plurality of nozzles 36. The spray system can spray water or an emulsion mixture onto the cutting rotor 22 or onto the material cut by the cutting rotor 22.

As noted above, the nozzles on spray bars on cold planers and rotary mixers can become clogged with material during operation.

Accordingly, the present system provides a system to detect whether a nozzle of the spray bar 34 is clogged. As will be detailed below, the system provides a pressure sensor in the spray bar. If the measured pressure exceeds a desired by a certain amount it can be assumed that one or multiple nozzles are plugged. For example, knowing the actual pressure and flow rate it can be compared to a table of desired values. Knowing there is an excessive pressure, the system can give a notification to the operator that the nozzles need to be cleaned or an automatic cleaning function can be actuated.

Figure 2:
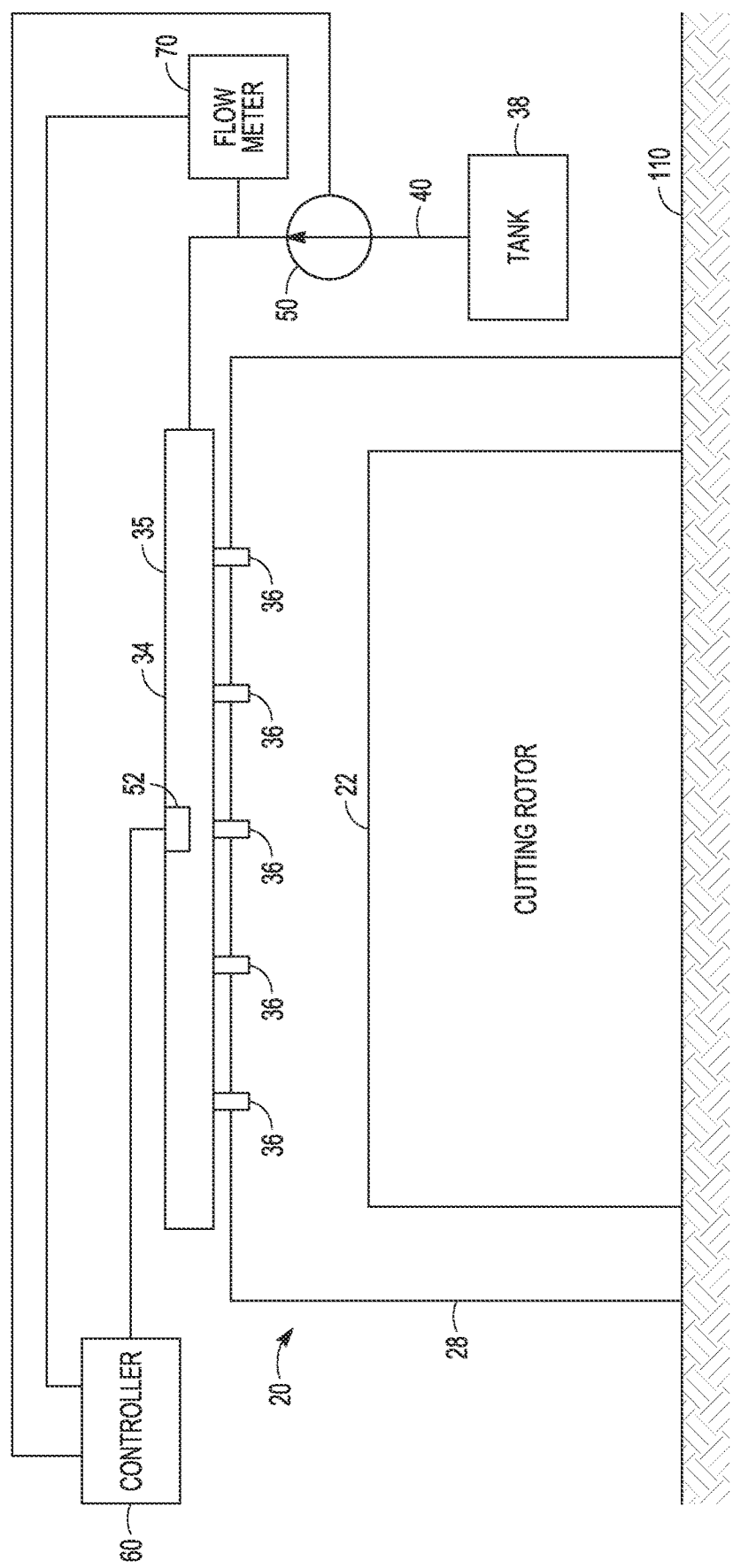
FIG. 2 shows a front view of a milling assembly, in accordance with one embodiment.

For example, FIG. 2 shows front view of the milling assembly 20 with the cutting rotor 22 within the housing 28. The spray system includes the tank 38 which can hold water, an emulsion mixture, or other liquid. The liquid is transferred to the spray bar 34 via fluid line 40 by a pump 50. In one example, the spray bar 34 can include a manifold 35 positioned above the housing 28. The liquid enters the spray bar 34 and then can be sprayed into the housing 28 by the plurality of nozzles 36 which extend through the top surface of the housing 28. The nozzles 36 can be configured to eject and spray the liquid onto the cutting rotor 22 or into the mixture of the surface 110 that is cut up and formed by the cutting rotor 22. For example, a reclaimer can often require a certain moisture level for the reclaimed material laid down and the spray bar 36 can deliver the proper amount of liquid to the mixture.

The present system further includes one or more pressure sensors 52 to detect a pressure of a liquid within the spray bar 34. For example, the system can include the one or more pressure sensors 52 positioned within the manifold 35 of the spray bar 34 to detect the fluid pressure within the spray bar 34. A controller 60 can be operatively coupled to the pressure sensor 52. The controller 60 can receive the pressure information from the pressure sensor 52 and be configured to determine whether the pressure of the liquid within the spray bar 34 has exceeded a pre-determined pressure threshold. If the controller 60 determines that the liquid pressure within the spray bar 34 is too high, then one or more of the nozzles 36 have been clogged. An alert can be sent to the operator and the operator can manually clean the nozzles. In one example, the work machine can include an automatic nozzle cleaning system and the controller 60 can activate such a system.

In one example, the controller can determine what the pressure should be within the spray bar 34 based on the flow rate of the liquid through the fluid line 40. For example, the operator can input a desired flow rate of the liquid, and the controller can adjust the pump accordingly. If the flow rate is known, the controller 60 can determine a predicted pressure. In one example, a flowmeter 70 can be utilized to measure the flowrate of the liquid and communicate that information to the controller 60. When the controller 60 knows the flow rate, the predicted pressure within the spray bar 34 can be determined. For example, the controller 60 can include a look up table to determine a predicted pressure based on the known flow rate.

If the measured pressure rises a pre-determined amount above the predicted pressure then the controller 60 determines that one or more of the nozzles 36 have been clogged. The present system allows the clog to be detected by the controller while the machine is operating normally. Accordingly, the work machine does not need to be stopped or interrupted to perform the testing. Thus, the pressure rise and clogging detection can be performed while the machine is operating, in real time.

In some example, a plurality of pressure sensors 52 can be utilized within the spray bar 34. For example, the pressure sensor can include a plurality of pressure sensors 52 with a pressure sensor located at each nozzle 36 such that the specific clogged nozzle 36 is identifiable due to the pressure rise at the nozzle.

Figure 3:
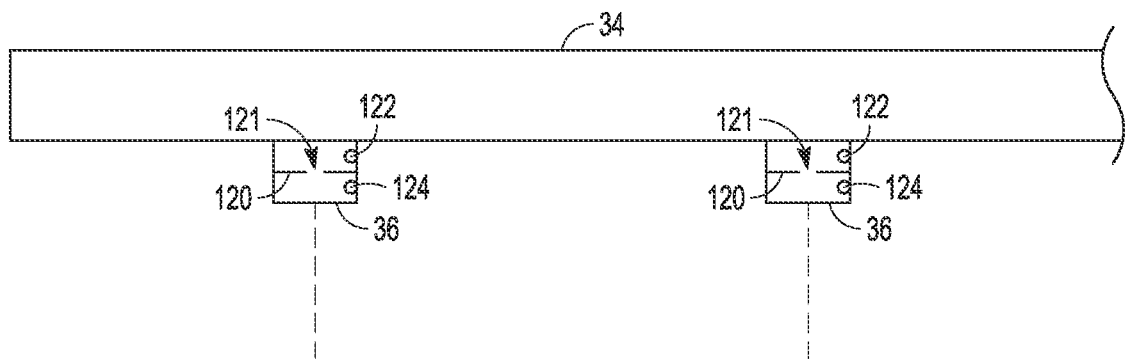
FIG. 3 shows a portion of a spray bar, in accordance with one embodiment.

For example, FIG. 3 shows a portion of the spray bar 34 utilizing a plurality of pressure sensors, in accordance with one embodiment. In this example each nozzle 36 can include an orifice 121 defined by a wall 120 within each nozzle. A pressure sensor 122 can be on the upstream side of the orifice 121 and a second pressure sensor 124 can be at a downstream portion of the orifice 121. Thus, in this example, the pressure sensor can be defined as an orifice flowmeter configured at each nozzle 36. The pressures measured at pressure sensors 122 and 124 can be sent to the controller 60 (FIG. 2) and if the pressure drop across the orifice 121 is negligible, then the controller 60 knows that the flowrate of the spray is at or near zero and that the nozzle 36 is clogged. Utilizing such a system, the controller 60 can determine which of the plurality of nozzles 36 is clogged. In a similar example, a venturi flowmeter with a venturi restriction, similar to the orifice flowmeter of FIG. 3, can be located at each nozzle 36.

In addition to the work machine discussed above, the present system can also be applicable to any work machine that uses a spray bar, such as a rotary mixer or reclaimer, where a cutting rotor is located within a drum housing. Further, the system can be used with an asphalt paver or a compactor which also can utilize spray bars and spray systems. Basically, the present system can be used for any work machine that uses a spray system and is susceptible to the nozzles becoming clogged.

Figure 4:
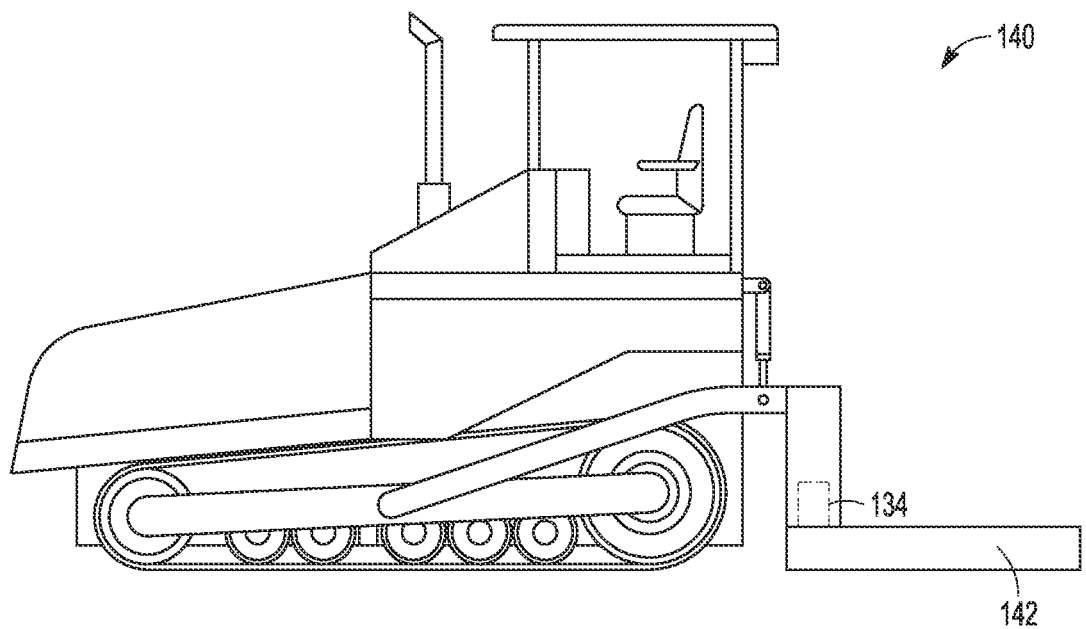
FIG. 4 shows a schematic side view of an asphalt paver, in accordance with one embodiment.

For example, FIG. 4 show a side, schematic view of an asphalt paver 140. The asphalt paver 140 can include a screed assembly 142. A spray system including a spray bar 134 can be located on or near the screed 142 to spray liquid where the liquid is needed. The spray bar 134 can be configured as discussed above where the spray bar 134 includes one or more pressure sensors coupled to a controller such that the controller can determine whether any of the nozzles of the spray bar 134 are clogged.

Figure 5:
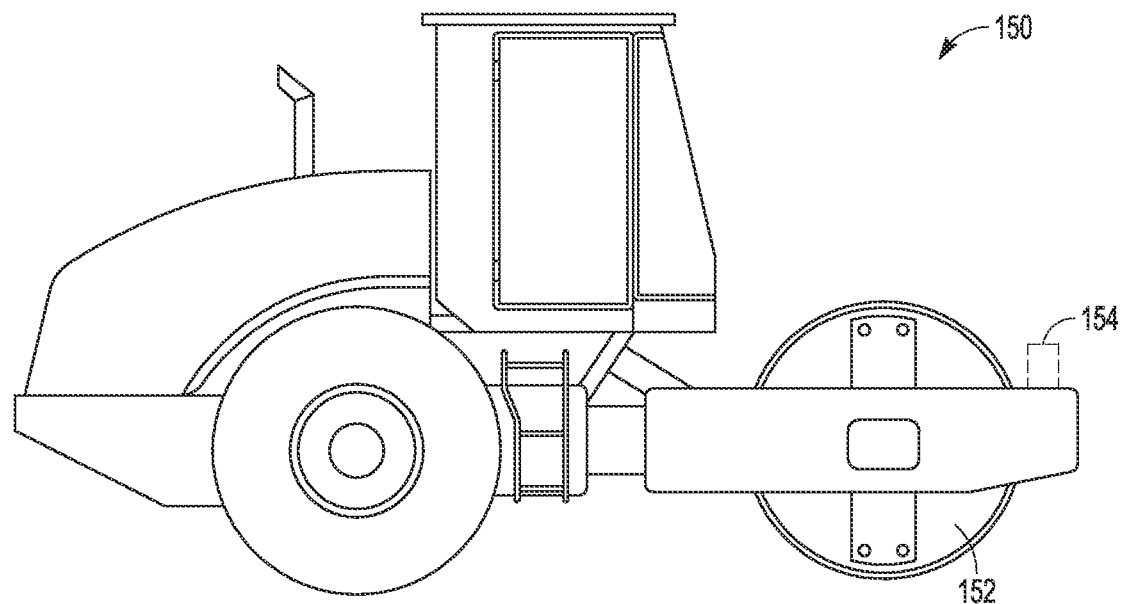
FIG. 5 shows a schematic side view of a compactor, in accordance with one embodiment.

FIG. 5 shows a side, schematic view of a compactor 150. The compactor 150 can include a roller 152. A spray system including a spray bar 154 can be located near the roller 152 to spray liquid onto the roller 152. The spray bar 154 can be configured as discussed above where the spray bar 154 includes one or more pressure sensors coupled to a controller such that the controller can determine whether any of the nozzles of the spray bar 154 are clogged.

INDUSTRIAL APPLICABILITY

As discussed, the present system can be applicable to any work machine that uses a spray bar, such as a cold planer, reclaimer, an asphalt paver, and a compactor. The system can be applicable to any work machine spray system where the nozzles can be susceptible to clogging.

Figure 6:
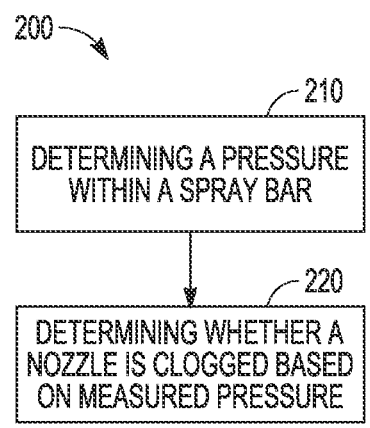
FIG. 6 shows a method of detecting a clogged nozzle, in accordance with one embodiment.

FIG. 6 shows a method 200 of detecting a clogged nozzle in a spray bar having a plurality of nozzles. The method 200 can include a first step 210 of determining a pressure of liquid within the spray bar, and a second step 220 where if the pressure of the liquid reaches a pre-determined threshold, determining that one or more of the nozzles of the spray bar are clogged.

In options, as discussed above, a controller can be used to receive and analyze the pressure information to determine if a nozzle is clogged. In one option, the method can include determining the flow rate of liquid by a flowmeter and the controller can include a look up table to determine a predicted pressure based on the known flow rate. Then, if pressure goes a certain pre-determined amount above the predicted pressure then the controller determines a nozzle is clogged. Thereafter, an alert can be sent to the machine operator to indicate that one or more nozzles need cleaning or the controller can automatically clean the nozzles using an automatic nozzle cleaner system, if equipped.

The above detailed description is intended to be illustrative, and not restrictive. The scope of the disclosure should, therefore, be determined with references to the appended claims, along with the full scope of equivalents to which such claims are entitled.

What is claimed is:

1. A work machine comprising:
   a frame;
   a spray system coupled to the frame and including a spray bar having a plurality of nozzles, the spray bar including a liquid input and only the plurality of nozzles as a liquid output;
   a pump to deliver a liquid to the spray bar;
   a pressure sensor to detect a pressure of the liquid within the spray bar; and
   a controller to adjust the pump to deliver the liquid at a constant flow rate and to determine whether the detected pressure of the liquid within the spray bar has exceeded a pre-determined pressure threshold at the constant flow rate,
   wherein, a flow rate of the liquid is determined by a flowmeter and the controller can include a look up table to determine a predicted pressure based on the known flow rate.

2. The work machine of claim 1, wherein the spray bar includes a manifold portion configured to receive the liquid input from the pump on the frame and the plurality of nozzles to eject the liquid.

3. The work machine of claim 1, wherein the pressure sensor includes one or more pressure sensors located within the spray bar.

4. The work machine of claim 3, wherein the pressure sensor includes plurality of pressure sensors including a pressure sensor located at each nozzle such that a specific clogged nozzle is identifiable.

5. The work machine of claim 1, wherein if the detected pressure goes a pre-determined amount above the predicted pressure then the controller determines one or more nozzles are clogged.

6. The work machine of claim 1, wherein the spray system is configured to deliver the liquid into a drum housing located on the frame.

7. The work machine of claim 6, wherein the spray system delivers the liquid onto a cutting rotor.

8. The work machine of claim 1, wherein the spray system is configured to the spray the liquid onto a roller of a compactor.

9. A milling machine comprising:
   a frame;
   a milling assembly on the frame including a drum housing;
   a cutting rotor located within the drum housing;
   a spray system including a spray bar having a plurality of nozzles to deliver a liquid within the drum housing, the spray bar including a liquid input and only the plurality of nozzles as a liquid output;
   a pump to deliver the liquid to the spray bar;
   a pressure sensor to detect a pressure of a liquid within the spray bar; and
   a controller to adjust the pump to deliver the liquid at a constant flow rate and to determine whether the pressure of the liquid within the spray bar has been exceeded pre-determined pressure threshold at the constant flow rate to determine whether any of the plurality of nozzles have been clogged,
   wherein, a flow rate of the liquid is determined by a flowmeter and a controller can include a look up table to determine a predicted pressure based on the known flow rate.

10. The milling machine of claim 9, wherein the milling machine is a cold planer and includes a first stage conveyor coupled to the frame, and the drum housing including a discharge port, wherein the first stage conveyor is positioned near the discharge port so as to receive material through the discharge port.

11. The milling machine of claim 9, wherein the liquid is directed by the spray bar onto the cutting rotor.

12. The milling machine of claim 9, wherein the spray bar includes a manifold portion configured to receive the liquid input from the pump on the frame and the plurality of nozzles to eject the liquid.

13. The milling machine of claim 9, wherein the pressure sensor includes one or more pressure sensors located within the spray bar.

14. The milling machine of claim 13, wherein the pressure sensor includes a plurality of pressure sensors including a pressure sensor located at each nozzle such that the specific clogged nozzle is identifiable.

15. A method of detecting a clogged nozzle in a spray bar having a plurality of nozzles, the method comprising:
   delivering a liquid to the spray bar via a pump at a constant flow rate;
   determining a pressure of the liquid within the spray bar, the spray bar including a liquid input and only the plurality of nozzles as a liquid output; and
   if the pressure of the liquid reaches a pre-determined threshold at the constant flow rate, determining that one or more of the nozzles of the spray bar are clogged,
   wherein a flow rate is determined by a flowmeter and a controller can include a look up table to determine a predicted pressure based on the known flow rate, and
   wherein if detected pressure goes a pre-determined amount above the predicted pressure then the controller determines a nozzle is clogged.

16. The method of claim 15, wherein, the spray bar includes a manifold portion configured to receive the liquid input from the pump and a plurality of nozzles to eject the liquid.

17. The method of claim 15, wherein determining the pressure of a liquid within the spray bar includes a pressure sensor located at each nozzle such that the specific clogged nozzle is identifiable.

\* \* \* \* \*